(12) United States Patent
Rispeter et al.

(10) Patent No.: US 6,199,845 B1
(45) Date of Patent: Mar. 13, 2001

(54) SPRING SUPPORT ARRANGEMENT

(75) Inventors: Siegfried Rispeter, Besigheim; Juergen Lauer, Stuttgart, both of (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 09/258,154

(22) Filed: Feb. 26, 1999

(30) Foreign Application Priority Data

Feb. 28, 1998 (DE) .............................................. 198 08 021

(51) Int. Cl.$^7$ .................................................... B60G 15/07
(52) U.S. Cl. ............................................................ 267/221
(58) Field of Search ........................... 267/179, 34, 221, 267/222; 280/124.145, 124.146, 124.147, 124.148, 124.149, 124.155, 124.179, FOR 119

(56) References Cited

U.S. PATENT DOCUMENTS

| | | | |
|---|---|---|---|
| 2,999,678 | * 9/1961 | Heckethorn | 267/221 |
| 4,256,292 | * 3/1981 | Sullivan, Jr. et al. | 267/8 R |
| 5,308,048 | * 5/1994 | Weaver et al. | 267/220 |
| 5,620,172 | * 4/1997 | Fulks et al. | 267/221 |
| 5,676,355 | * 10/1997 | Hayashi et al. | 267/221 |

FOREIGN PATENT DOCUMENTS

| | | |
|---|---|---|
| 35 38 150A1 | 4/1987 | (DE) . |
| 88 02 370 U | 7/1988 | (DE) . |
| 196 32 183A1 | 11/1997 | (DE) . |
| 2283711A | 5/1995 | (GB) . |

OTHER PUBLICATIONS

English language abstracts of DE 88 02 370 U1, DE 196 32 183, and GB–A–2 283 711.
German Office Action, Nov. 24, 1998.
* cited by examiner

*Primary Examiner*—Matthew C. Graham
*Assistant Examiner*—Robert A. Siconolfi
(74) *Attorney, Agent, or Firm*—Evenson, McKeown, Edwards & Lenahan, P.L.L.C.

(57) ABSTRACT

In a spring support for a suspension strut of a motor vehicle, a spring collar is provided for supporting a coil spring. The spring support is connected in use with an outer tube of the spring strut. The spring collar comprises a pot-shaped receptacle for the outer tube of the spring strut. The collar is located eccentrically with respect to the outer tube and receptacle and has an annular spring coil support section located at an edge of the collar. This spring support section is connected with the pot-shaped receptacle by ribs that extend like the arms of a star toward the receptacle and have spaces between them. The spring support, including pot-shaped receptacle, ribs and annular spring coil support section, are formed as an integral cast part.

14 Claims, 3 Drawing Sheets

SPRING SUPPORT ARRANGEMENT

BACKGROUND AND SUMMARY OF THE INVENTION

This application claims the priority of German application 198 08 21.2, filed in Germany on Feb. 26, 1999, the disclosure of which is expressly incorporated by reference herein.

The invention relates to a spring support for a suspension spring strut of a motor vehicle of the type having a coil spring supporting spring collar connectable with an outer tube of the suspension strut.

A spring support for a suspension strut that uses a spring collar is known from German Patent Document DE 88 02 370 U1, said collar being fastened to the outer tube of the strut. A bearing for a tie rod is provided on the spring collar. Projections are provided in the surfaces of the collar to reinforce the collar, said surfaces being offset from one another.

A goal of the invention is to provide a spring support for a coil spring on a suspension strut with improved weight and strength characteristics. In preferred embodiments, said spring support is in the form of a lightweight one-piece casting.

This goal is achieved according to preferred embodiments of the invention by providing a spring support comprising a pot shaped receptacle engageable over the outer tube, a spring support collar surrounding the pot shaped receptacle and extending eccentrically with respect to a central axis of the pot shaped receptacle, said spring support collar having an annular spring support section, and a plurality of ribs connecting the spring support collar spring support section with the pot shaped receptacle, said ribs extending in a star shaped pattern between the receptacle and the spring support section with spaces between respective adjacent ones of said ribs.

Principal advantages achieved with the invention consist in the fact that the spring collar has openings or spaces between the ribs, which form the basis of its light weight. In addition, an exact attachment to the outer tube of the strut is made possible by a pot-shaped receptacle.

According to certain preferred embodiments of the invention, ribs extend between the pot-shaped receptacle and a spring coil support provided at the edge, which is made annular. The ribs are also preferably made approximately U-shaped in cross section so that weight can also be saved in this way over solid ribs.

Preferred embodiments of the invention provide that the spring collar advantageously has downwardly pointing extensions for use with a left and a right vehicle wheel, in which extensions bearings for a stabilizer hanger are formed. Thus, the same standard part spring support can be used for both left and right vehicle wheels, even though the spring end extends eccentrically with respect to the outer tube of the strut.

In order to provide ventilation at the pot of the receptacle when a helper spring is used, ventilation channels are provided in the upper bottom wall of the pot-shaped receptacle in certain preferred embodiments of the invention.

Other objects, advantages and novel features of the present invention will become apparent from the following detailed description of the invention when considered in conjunction with the accompanying drawings.

DETAILED DESCRIPTION OF THE DRAWINGS

Figure 1:
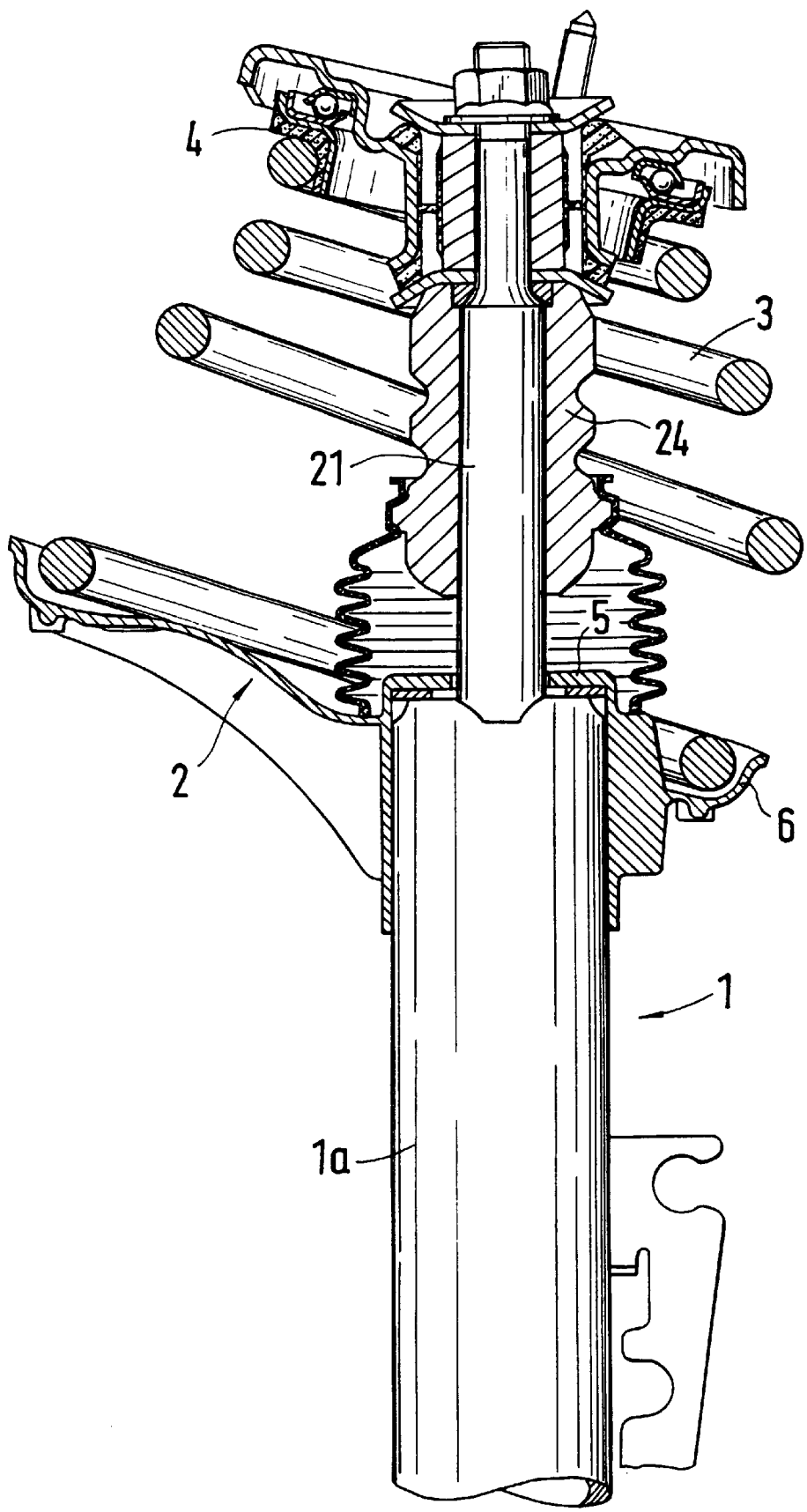
FIG. 1 is a part sectional schematic view of a suspension strut with a spring collar connected, constructed according to a preferred embodiment of the invention.
Figure 2:
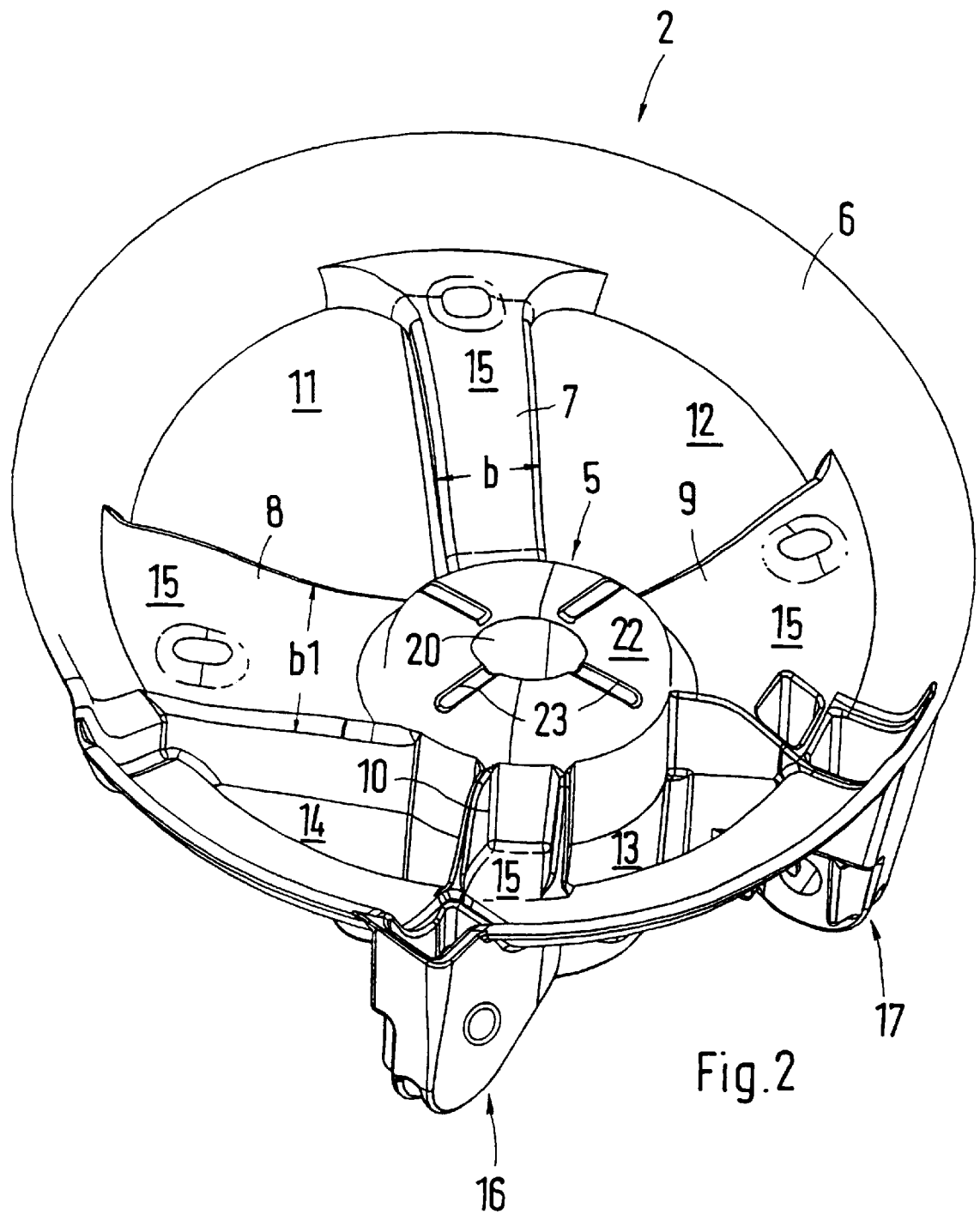
FIG. 2 is a perspective view from above of the spring collar of the embodiment of FIG. 1.
Figure 3:
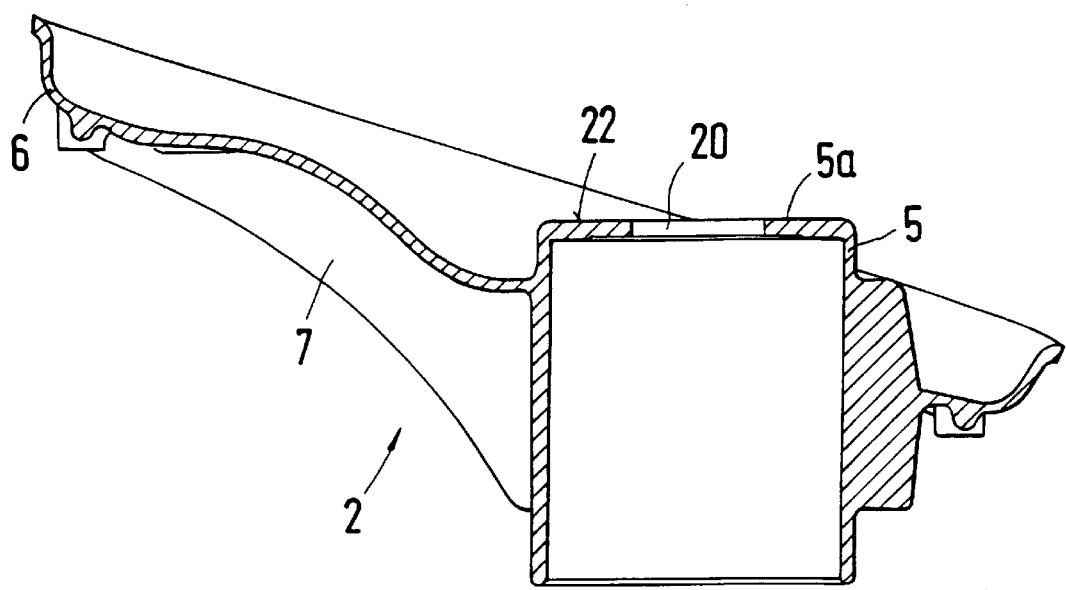
FIG. 3 is a sectional view through the spring collar of the embodiment of FIG. 1.
Figure 4:
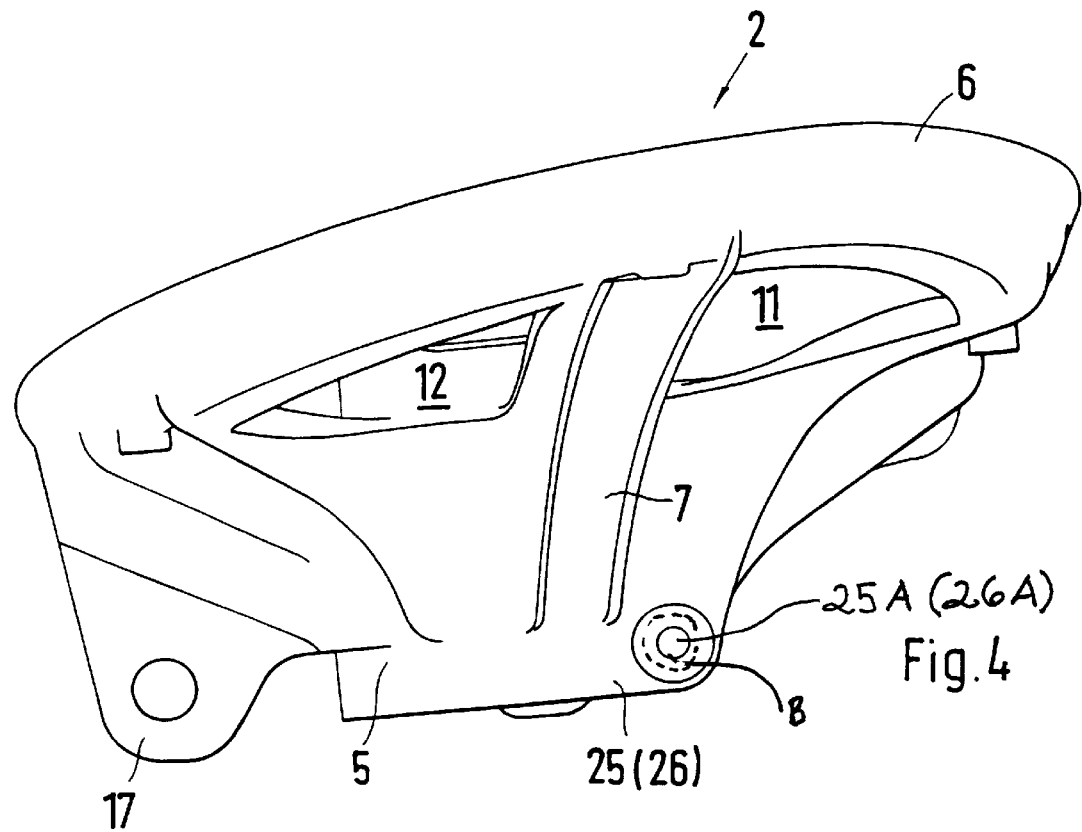
FIG. 4 is a perspective view from below of the spring collar of the embodiment of FIG. 1.

FIG. 1 shows a vehicle wheel suspension strut assembly 1 with a connected spring collar 2 on which a coil spring 3 is supported. The spring 3 is attached to the vehicle body by an additional upper spring collar 4.

Spring collar 2 essentially comprises a pot-shaped receptacle 5 with which an annular spring coil support section 6 is associated eccentrically. The support section is connected with pot-shaped receptacle 5 by a plurality of radial ribs 7, 8, 9, and 10.

These ribs 7 to 10 extend like the arms of a star from receptacle 5 and are provided with different widths b, $b_1$, etc. corresponding to the loads to be accepted. They are made approximately in the shape of a U and form spaces 11, 12, 13, and 14 between them.

Ribs 7 to 10 have ridges with surfaces 15 directed toward spring 3, so that an approximately solid surface is obtained except for the spaces between the ribs, the annular support section 6 and the receptacle 5.

Extensions 16, 17 are provided on the underside of the annular spring coil support 6 to form bearings to accept stabilizer hangers.

The spring collar is designed to be selectively usable for both left vehicle wheels and right vehicle wheels. Extension 16 can serve for example as a stabilizer hanger of a left vehicle side and extension 17 can serve for example as a stabilizer hanger of a right vehicle side.

Pot-shaped receptacle 5 has an opening 20 in upper bottom 5a to allow a piston rod 21 of suspension strut 1 to pass through. Ventilation channels 23 for a helper spring 24 are located in the outer surface 22 of receptacle 5.

Receptacle 5 has spaced legs 25, 26 provided with holes 25A, 26A into which a mounting bolt (B (shown in dash lines) is insertable for attachment to outer tube 1a of suspension strut 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Spring support for a suspension strut of a motor vehicle, said spring support having a spring collar to support a coil spring and being connectable with an outer tube of the suspension strut, wherein the spring collar has a pot-shaped receptacle for the outer tube, wherein the spring collar is located eccentrically with respect to the receptacle, wherein the collar has an annular spring coil support on an outer edge which is connected with the pot-shaped receptacle by ribs, said ribs extending in the shape of the arms of a star toward the receptacle and having spaces in between the ribs, and wherein the spring collar has two extensions at the edge that are directed downward and are spaced apart from one another, said extensions each providing bearings for a stabilizer hanger.

2. Spring support according to claim 1, wherein the ribs are made approximately U-shaped in cross section and have ridges directed toward a coil spring being supported by the spring collar.

3. Spring support according to claim 1, wherein the spring collar can be used with the two bearings as stabilizer hangers for a left vehicle wheel and a right vehicle wheel.

4. Spring support according to claim 2, wherein the spring collar can be used with the two bearings as stabilizer hangers for a left vehicle wheel and a right vehicle wheel.

5. Spring support according to claim 1, wherein the pot-shaped receptacle has vent channels for a helper spring on its external bottom surface.

6. Spring support according to claim 2, wherein the pot-shaped receptacle has vent channels for a helper spring on its external bottom surface.

7. Spring support according to claim 3, wherein the pot-shaped receptacle has vent channels for a helper spring on its external bottom surface.

8. Spring support according to claim 4, wherein the pot-shaped receptacle has vent channels for a helper spring on its external bottom surface.

9. A spring support connectable with a vehicle suspension strut outer tube and operable to support an end of a coil spring of the suspension strut, said spring support comprising:

a pot shaped receptacle engageable over the outer tube, a spring support collar surrounding the pot shaped receptacle and extending eccentrically with respect to a central axis of the pot shaped receptacle, said spring support collar having an annular spring support section, and a plurality of ribs connecting the spring support collar spring support section with the pot shaped receptacle, said ribs extending in a star shaped pattern between the receptacle and the spring support section with spaces between respective adjacent ones of said ribs, wherein the spring collar has two extensions at the edge that are directed downward and are spaced apart from one another, said extensions each providing bearings for a stabilizer hanger.

10. A spring support according to claim 9, wherein the pot-shaped receptacle has vent channels for a helper spring on its external bottom surface.

11. A spring support according to claim 9, wherein said receptacle, ribs and spring support collar are formed integrally with one another.

12. A spring support according to claim 9, wherein said receptacle, ribs and spring support collar are formed as a single cast part.

13. A spring support according to claim 12, wherein said single cast part is a metal cast part.

14. A spring support according to claim 9, wherein the ribs are made approximately U-shaped in cross section and have ridges directed toward a coil spring being supported by the spring collar.

* * * * *